United States Patent
Bonnissel

(10) Patent No.: US 12,111,014 B2
(45) Date of Patent: Oct. 8, 2024

(54) METHOD AND SYSTEM FOR COMPUTING A TRANSITION PARAMETER OF A LIQUEFIED GAS STORAGE MEDIUM

(71) Applicant: GAZTRANSPORT ET TECHNIGAZ, Saint-Remy-les-Chevreuse (FR)

(72) Inventor: Marc Bonnissel, Saint-Remy-les-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 238 days.

(21) Appl. No.: 17/950,882

(22) Filed: Sep. 22, 2022

(65) Prior Publication Data

US 2023/0098469 A1    Mar. 30, 2023

(30) Foreign Application Priority Data

Sep. 30, 2021   (FR) ...................................... 2110369

(51) Int. Cl.
F17C 13/02    (2006.01)

(52) U.S. Cl.
CPC .......... *F17C 13/026* (2013.01); *F17C 13/025* (2013.01); *F17C 13/028* (2013.01); *F17C 2221/033* (2013.01); *F17C 2223/0153* (2013.01); *F17C 2250/032* (2013.01); *F17C 2250/0426* (2013.01); *F17C 2250/043* (2013.01); *F17C 2250/0439* (2013.01);
(Continued)

(58) Field of Classification Search
CPC .... F17C 13/026; F17C 13/025; F17C 13/028; F17C 2221/033; F17C 2223/0153; F17C 2250/032; F17C 2250/0426; F17C 2250/043; F17C 2250/0439; F17C 2250/0447; F17C 2250/0626; F17C 2265/031; F17C 2270/0105
USPC ............................................................ 141/4
See application file for complete search history.

(56) References Cited

U.S. PATENT DOCUMENTS

2018/0313498 A1* 11/2018 Antola ..................... F17C 13/04
2019/0226640 A1*  7/2019 Ben Belgacem-Strek ...................
                                                          F17C 13/021
2019/0383236 A1* 12/2019 Garner ............... F02M 21/0215

FOREIGN PATENT DOCUMENTS

CN          203948934 U  * 11/2014
DE    10 2016 216525 A1    3/2018
EP           3390893 B1    10/2019

OTHER PUBLICATIONS

CN 203948934 U—English Translation (Year: 2014).*
French Search Report for corresponding French patent application No. FR 2110369, dated Jun. 10, 2022.

* cited by examiner

*Primary Examiner* — Timothy L Maust
*Assistant Examiner* — Christopher M Afful
(74) *Attorney, Agent, or Firm* — Notaro, Michalos & Zaccaria P.C.

(57) ABSTRACT

The present invention relates to a computer-implemented method and system for computing a transition parameter of a liquefied gas storage medium, the storage medium having at least one sealed and unrefrigerated tank, the transition parameter characterizing an evolution of a two-phase mixture contained in the sealed and unrefrigerated tank between an initial state and a final state, the two-phase mixture including a liquid phase and a vapour phase, the transition parameter may be a duration of the transition, a liquid bleeding rate or a vapour bleeding rate.

17 Claims, 4 Drawing Sheets

(52) U.S. Cl.
CPC ............... *F17C 2250/0447* (2013.01); *F17C 2250/0626* (2013.01); *F17C 2265/031* (2013.01); *F17C 2270/0105* (2013.01)

Fig. 5

| | |
|---|---|
| $P_i$ (mbarg) | 350 |
| $T_i$ (°C) | -161.15 |
| $V_{l,i}$ (%) | 95 |
| $N_2$ | 0.1 |
| $CO_2$ | 0 |
| $C_1$ | 99 |
| $C_2$ | 0.9 |
| $C_3$ | 0 |
| $iC_4$ | 0 |
| $nC_4$ | 0 |
| $iC_5$ | 0 |
| $nC_5$ | 0 |
| $C_6$ | 0 |

| | |
|---|---|
| $P_r$ (mbarg) | 2 000 |
| $\tau$ (d/h) | 22d 21h |
| $\dot{m}_v$ (kg/h) | 100 |
| $\dot{m}_l$ (kg/h) | 0 | though
METHOD AND SYSTEM FOR COMPUTING A TRANSITION PARAMETER OF A LIQUEFIED GAS STORAGE MEDIUM

TECHNICAL FIELD

The invention relates to a method and a system for computing a transition parameter of a liquefied gas storage medium. More specifically, the transition parameter characterizes a thermodynamic process of a two-phase mixture of liquefied gas and its vapour contained in one or more sealed and unrefrigerated tank(s).

TECHNOLOGICAL BACKGROUND

A liquefied gas is a gas at normal temperature and pressure conditions that is made liquid by cooling or compression.

Sealed, thermally insulated and unrefrigerated tanks are commonly used for transporting low-temperature liquefied gases, such as liquefied petroleum gas (also called "LPG") transported at a temperature ranging between −50° C. and 0° C., liquid hydrogen (also called "LH2") transported at a temperature of −253° C. or even liquefied natural gas (hereafter called "LNG") transported at a temperature of −162° C. These tanks also can be intended for storing liquefied gas used as fuel for propelling a land, marine or air vehicle.

A tank containing a liquefied gas cooled to a low temperature manifests as a two-phase mixture of liquid, the liquefied gas, overlaid by its vapour, the "gaseous ceiling".

When transporting or storing the liquefied gas, the tank can be subject to pressure variations. Heat ingress through the tank walls causes the liquefied gas to evaporate and the pressure in the gaseous ceiling to increase. Conversely, any vapour bleeding, for example, in order to fuel the engine of a liquefied gas propelled vehicle, causes the pressure in the gaseous ceiling to decrease.

However, if the pressure is too low, this risks causing the sealing membrane of the tank to deform or detach ("collapsing"). If the pressure is too high, this in turn risks causing the sealing membrane to deteriorate and even causing damage to the tank itself. However, the structural integrity of the membrane and of the tank containing a liquefied gas is particularly important given the flammable or explosive nature of the liquid that is transported or stored, such as LNG.

To protect against the damaging effects of any overpressure or underpressure, the tanks are equipped with safety valves that open automatically above their setting pressure, and vacuum breaker valves that open automatically below their setting pressure.

In order to control the pressure variations inside the tank within the range of setting pressures of the vacuum breaker and safety valves, an operator can decide to carry out liquid or vapour bleeding.

In order to limit the increase in pressure inside the tank, the evaporation gas can, at the discretion of the operator, be flared or vented, if permitted by the regulatory conditions. In other circumstances, when the engine of a liquefied gas propelled vehicle is supplied by vapour bleeding, the operator can limit the pressure reduction inside the tank by favouring liquid bleeding, the forced vapourization of which allows the engine supply to be supplemented.

Patent EP 3390893 describes a method and a system for real-time computation, according to an iterative method, of the duration of the pressure build-up of an unrefrigerated tank containing LNG up to the setting pressure of the safety valves.

SUMMARY

It is beneficial to have a high degree of operational flexibility when transporting or storing liquefied gas, and to therefore gain flexibility in the supply chain. Thus, one objective underlying some aspects of the invention is to be able to compute, in real-time or in advance, transition parameters, namely the duration of a pressure variation, the liquid bleeding rate or the vapour bleeding rate, characterizing the thermodynamic behaviour of the liquefied gas contained in the sealed and unrefrigerated tank. This information is a decision-making and optimization tool for the operator, particularly allowing them to develop management scenarios in order to minimize evaporation losses when transporting or storing the liquefied gas.

One idea behind the invention is to directly compute a transition parameter characterizing a thermodynamic process of a two-phase mixture of liquefied gas and its vapour, contained in one or more sealed and unrefrigerated tank(s), by completing a mass balance and an energy balance between an initial state and a final state specified by the operator.

According to one embodiment, the invention provides a computer-implemented method for computing a transition parameter of a liquefied gas storage medium, the storage medium comprising at least one sealed and unrefrigerated tank, the transition parameter characterizing an evolution of a two-phase mixture contained in the sealed and unrefrigerated tank between an initial state and a final state, the two-phase mixture including a liquid phase and a vapour phase, said transition parameter may be a duration of the transition $\tau$, a liquid bleeding rate $\dot{m}_l$ or a vapour bleeding rate $\dot{m}_v$. The method comprises the steps of:

- determining, for the liquid phase and the vapour phase in the initial state, initial mass densities $\rho_{l,i}$ and $\rho_{v,i}$, and initial internal mass energies $U_{l,i}$ and $U_{v,i}$ on the basis of an initial liquid phase temperature $T_{l,i}$, an initial vapour phase temperature $T_{v,i}$, an initial vapour phase pressure $P_i$, an initial liquid phase volume $V_{l,i}$ and an initial liquid phase composition $x_{l,i}$;
- determining, for the liquid phase and the vapour phase in the final state, final mass densities $\rho_{l,f}$ and $\rho_{v,f}$, final internal mass energies $U_{l,f}$ and $U_{v,f}$, and final mass enthalpies $H_{l,f}$ and $H_{v,f}$ on the basis of an equation of state and a final vapour phase pressure $P^f$;
- computing the transition parameter using the following equation:

$$\tau(\dot{Q}+\dot{m}_v(H_{v,f}-\overline{U})+\dot{m}_l(H_{l,f}-\overline{U}))=\rho_{l,i}V_{l,i}(\overline{U}-U_{l,i})+$$
$$\rho_{v,i}(V_t-V_{l,i})(\overline{U}-U_{v,i})+\rho_{v,f}V_t(U_{v,f}-\overline{U})$$

in which $\dot{Q}$ corresponds to an energy contribution by heat ingress through the walls of a tank per unit of time, $V_t$ corresponds to a total volume of the tank and with $$\overline{U} = \frac{\rho_{l,f}U_{l,f} - \rho_{v,f}U_{v,f}}{\rho_{l,f} - \rho_{v,f}}.$$

Since mass and energy are extensive properties, the conservation equations of mass and energy in multi-tanks are identified with the sum of these same equations considered for each tank. Thus, according to another embodiment, the storage medium comprises a plurality of tanks and, for the liquid phase and the vapour phase, the initial and final mass densities, the initial and final internal mass energies and the final mass enthalpies are determined for each tank, and the transition parameter is computed using the following equation:

$$\tau(\dot{Q}_j + \Sigma \dot{m}_{v,f,j}(H_{v,f,j} - \overline{U}_j) + \Sigma \dot{m}_{l,j}(H_{l,f,j} - \overline{U}_j)) = \Sigma \rho_{l,i,j} V_{l,i,j}(\overline{U}_j - U_{l,i,j}) + \Sigma \rho_{v,i,j}(V_{t,j} - V_{l,i,j})(\overline{U}_j - U_{v,i,j}) + \Sigma \rho_{v,f,j} V_{t,j}(U_{v,f,j} - \overline{U}_j)$$

with the exponent j referring to the index of the considered tank.

According to a particular embodiment, the transition parameter is the transition duration $\tau$, with the vapour bleeding rate $\dot{m}_v$ and the liquid bleeding rate $\dot{m}_l$ being predetermined.

According to an alternative embodiment, the transition parameter is the vapour bleeding rate $\dot{m}_v$, with the liquid bleeding rate $\dot{m}_l$ and the duration of the transition t being predetermined.

According to another alternative embodiment, the transition parameter is the liquid bleeding rate $\dot{m}_l$, with the duration of the transition t and the vapour bleeding rate $\dot{m}_v$ being predetermined.

According to a particular embodiment, the storage medium comprises at least one level sensor configured to determine the volume of the liquid phase in at least one sealed and unrefrigerated tank, and the initial volume of the liquid phase $V_{l,i}$ is determined by the level sensor.

According to a particular embodiment, the storage medium comprises at least one temperature sensor configured to measure the temperature of the vapour phase and at least one temperature sensor configured to measure the temperature of the liquid phase in at least one sealed and unrefrigerated tank, and the initial temperature of the vapour phase $T_{v,i}$ and the initial temperature of the liquid phase $T_{l,i}$ are measured by the temperature sensors.

According to a particular embodiment, the storage medium comprises at least one pressure sensor configured to measure the pressure of the vapour phase in at least one sealed and unrefrigerated tank, and the initial pressure of the vapour phase $P_i$ is measured by the pressure sensor.

According to a particular embodiment, the storage medium comprises at least one composition sensor configured to determine the composition of the liquid phase in at least one sealed and unrefrigerated tank, and the initial composition of the liquid phase $x_{l,j}$ is determined by the composition sensor.

According to a particular embodiment, the storage medium comprises a flow rate sensor configured to measure a vapour bleeding mass flow rate or a liquid bleeding mass flow rate exiting a sealed and unrefrigerated tank, and the liquid bleeding mass flow rate $\dot{m}_l$ or the vapour bleeding mass flow rate $\dot{m}_v$ is determined by the flow rate sensor.

According to one embodiment, the storage medium comprises at least one sealed and unrefrigerated tank equipped with a safety valve and the final pressure of the vapour phase $P_f$ is less than or equal to the setting pressure of the safety valve and is greater than or equal to the initial pressure of the vapour phase $P_i$.

According to another embodiment, the storage medium comprises at least one sealed and unrefrigerated tank equipped with a vacuum breaker valve and the final pressure of the vapour phase $P_f$ is greater than or equal to the setting pressure of the vacuum breaker valve and is less than or equal to the initial pressure of the vapour phase $P_i$.

According to a particular embodiment, the two-phase mixture is a combustible mixture.

According to another particular embodiment, the two-phase mixture is liquefied natural gas. According to other particular embodiments, the two-phase mixture may be liquefied petroleum gas or liquefied hydrogen.

According to a particular embodiment, the sealed and unrefrigerated tank is a fuel reservoir for propelling a land, marine, air or space vehicle.

According to another particular embodiment, the marine vehicle is a liquefied natural gas propelled tanker or vessel.

According to embodiments, the invention also provides a non-transitory computer readable medium comprising program instructions that, when executed by an apparatus, cause the apparatus to perform the above-mentionned methods. The apparatus may be a computer or similar hardware.

According to one embodiment, the invention also provides a system for computing a transition parameter of a liquefied gas storage medium characterizing an evolution of a two-phase mixture between an initial state and a final state, the transition parameter may be a duration of the transition $\tau$, a liquid bleeding rate $\dot{m}_l$ or a vapour bleeding rate $\dot{m}_v$. The system comprises a storage medium comprising at least one sealed and unrefrigerated tank containing the two-phase mixture, said two-phase mixture including a liquid phase and a vapour phase, a computation device configured to implement one of the methods as previously described, and a human-machine interface interacting with the computation device in order to notify an operator of the computed transition parameter.

According to one embodiment, the invention also provides a land, marine or air vehicle comprising a fuel reservoir for propelling the vehicle and an aforementioned system configured to compute a transition parameter of the fuel tank.

BRIEF DESCRIPTION OF THE FIGURES

The invention will be better understood, and further aims, details, features and advantages thereof will become more clearly apparent, throughout the following description of several particular embodiments of the invention, which are provided solely by way of a non-limiting illustration, with reference to the accompanying drawings.

FIG. 5 schematically shows an interface that can be used to convey input data specific to the storage system and/or a transition parameter to the operator.

DESCRIPTION OF THE EMBODIMENTS

The following embodiments are described with respect to a motorized marine vehicle, a liquefied gas propelled tanker or vessel, comprising at least one sealed and unrefrigerated tank for transporting liquefied gas or acting as a reservoir for supplying the one or more engine(s) of the vehicle with liquefied gas.

The general shape of a sealed and unrefrigerated tank can assume different types: polyhedral (for example, prismatic), cylindrical, spherical or other geometries are possible. The unrefrigerated tank can have a single or double sealing membrane. The sealing membranes are generally made of a thin stainless steel sheet or of Invar. A primary membrane is generally in direct contact with the liquefied gas at very low temperatures.

Figure 1:
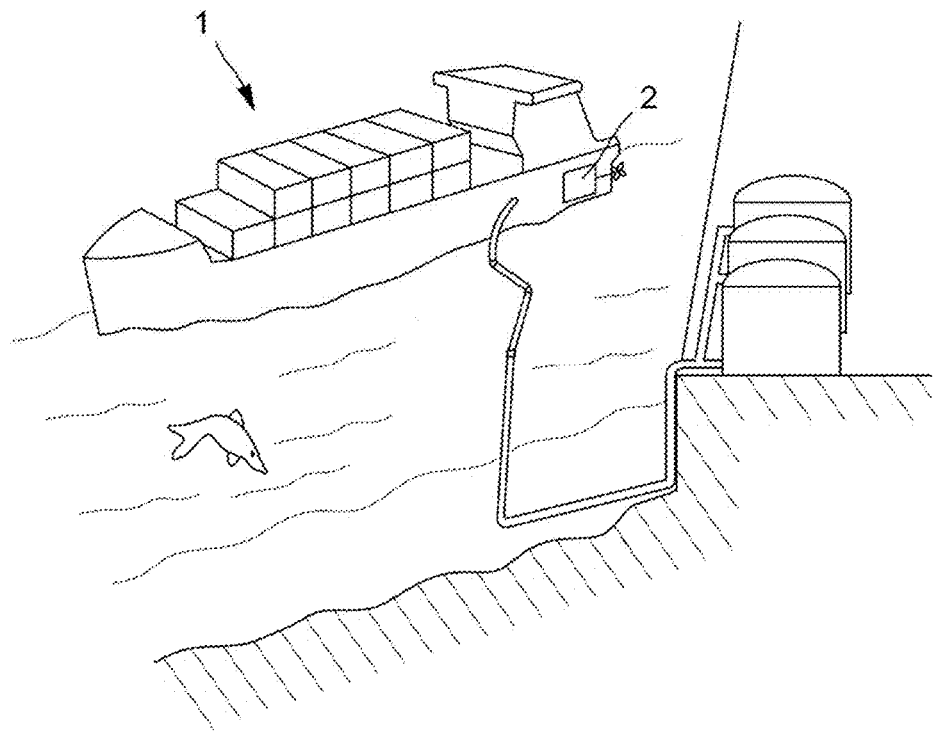
FIG. 1 is a schematic representation of a liquefied gas propelled vessel.

FIG. 1 illustrates a liquefied gas propelled vessel 1 comprising an unrefrigerated sealed tank 2 acting as a reservoir for storing the liquefied gas intended to supply its engines.

Figure 2:
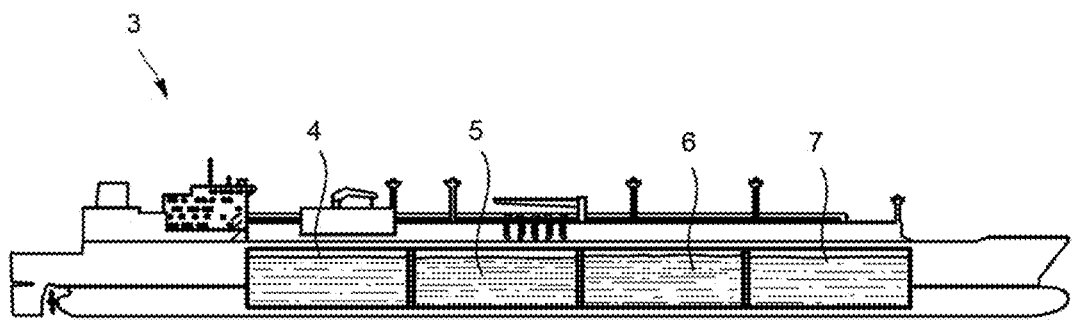
FIG. 2 is a schematic cross-sectional representation of a liquefied gas transportation vessel.

FIG. 2 illustrates a liquefied gas transportation vessel or tanker 3 comprising four sealed and unrefrigerated tanks 4, 5, 6 and 7.

It is known that heat ingress through the walls of a sealed and unrefrigerated tank causes the temperature inside the tank to increase, leading to the evaporation of the liquefied gas contained therein and a corresponding increase in pressure in the gaseous ceiling.

In LNG tankers or LNG-propelled vessels, the evaporated gas ("Boil-Off Gas", abbreviated to BOG) can be used to supply the main engines, which propel the ship, and the auxiliary engines, which generate on-board electricity. If the evaporated gas flow is greater than the consumption of the engines, the excess is directed to one or two boiler(s) or, if permitted by the regulatory conditions, is vented in order to curb the overpressure caused by the evaporation. Conversely, when the flow of evaporated gas is less than the consumption of the engines, LNG bleeding can be carried out. Forced evaporation of the bled liquefied gas ("Forcing Boil-Off Gas", abbreviated to FBOG) then allows the difference in flow rates to be offset between natural evaporation and the consumption of the engines, which limits the depression of the gaseous ceiling contained in the tank 2, 4, 5, 6 or 7.

In order to avoid any dry losses by flaring or venting any excess gas evaporated in the event of overpressure, the operator must be able to know, in advance or in real-time, the transition parameters, namely the duration of the pressure variation $\tau$, the vapour bleeding rate $\dot{m}_v$ and the liquid bleeding rate $\dot{m}_l$, that characterize the thermodynamic behaviour of the LNG contained in the sealed and unrefrigerated tank 2, 4, 5, 6 or 7.

Figure 3:
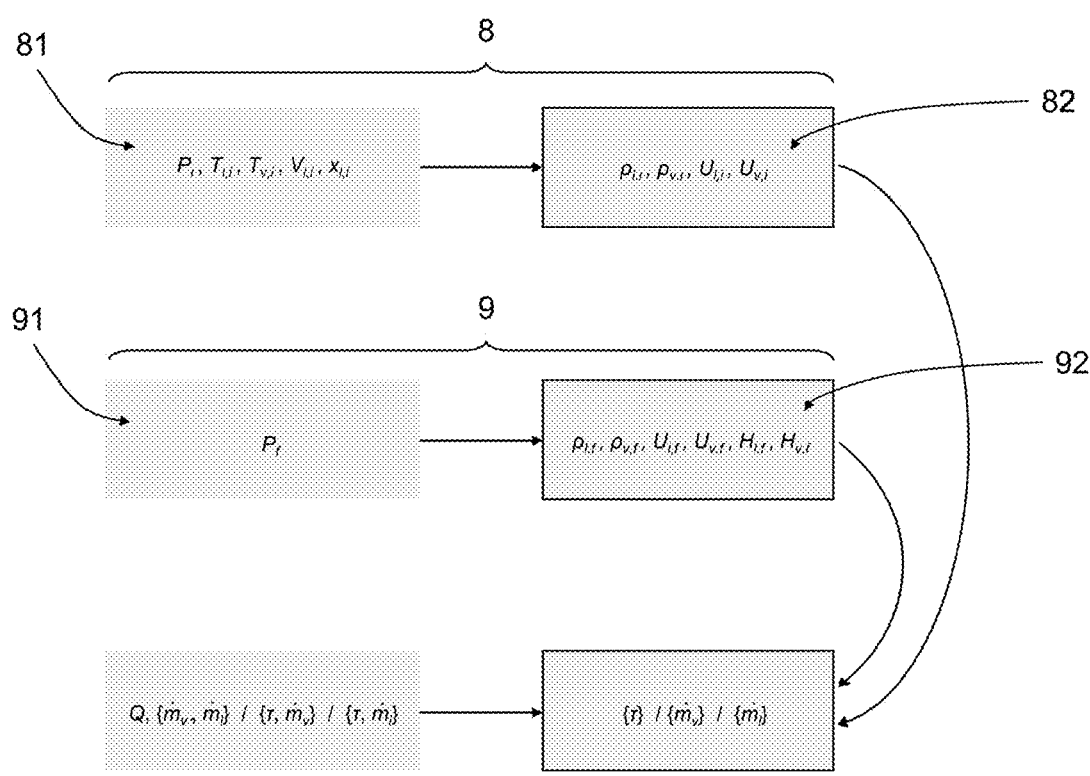
FIG. 3 is a flow chart showing a method for computing a transition parameter according to one embodiment of the invention.

FIG. 3 is a flowchart showing a method for computing a transition parameter. The transition parameter characterizes a thermodynamic evolution, between an initial state 8 and a final state 9, of a two-phase mixture of liquefied gas and vapour contained in a sealed and unrefrigerated tank 2, 4, 5, 6 or 7. At a given time, the thermodynamic state of the two-phase mixture is described by a set of state variables that characterize its macroscopic physical properties. The initial state 8 either corresponds to a thermodynamic state of the two-phase mixture specified by the operator, or to the thermodynamic state of the two-phase mixture when the method for computing the transition parameter is triggered. The final state 9 corresponds to a thermodynamic state of the two-phase mixture specified by the operator.

According to a first embodiment, by knowing the temperatures, pressures, volumes and compositions of the liquefied gas and its vapour, in the initial state 8 and in the final state 9, all the physical properties of the two-phase mixture (mass densities, internal energies and enthalpies) can be determined.

In the initial state 8, for the liquid phase and the vapour phase, the computed data 82, namely the mass density $\rho_{l,i}$ and $\rho_{v,i}$, and the internal mass energies $U_{l,i}$ and $U_{v,i}$, are determined on the basis of the input data 81, that is the liquid phase temperature $T_{l,i}$, the vapour phase temperature $T_{v,i}$, the vapour phase pressure $P_i$, the liquid phase volume $V_{l,i}$ and the liquid phase composition $x_{l,i}$. The temperatures, the pressure and the volume can be measured by sensors or specified by the operator. The composition of the liquefied gas $x_{l,i}$ sets the composition of its vapour $x_{v,i}$. In particular, if the liquefied gas is LNG, its composition $x_{l,i}$ is specified in the quality certificate and the bill of lading issued at the time of loading into the sealed and unrefrigerated tank 2, 4, 5, 6 or 7, or is measured using a composition sensor, or is even pre-computed using an "ageing" model of the LNG.

In the final state 9, the operator specifies the input data 91, that is the pressure of the vapour phase $P_f$. The two-phase mixture is assumed to be in thermodynamic equilibrium and the liquefied gas is assumed to be at its bubble point. According to these assumptions, the pressure of the vapour phase $P_f$ sets both the temperature of the liquefied gas $T_{l,f}$ and the temperature of its vapour $T_{v,f}$ inside the tank, which are equal. The composition of the liquefied gas $x_{l,f}$ and the composition of its vapour $x_{v,f}$ are determined on the basis of an equation of state. In a preferred embodiment, this equation of state is the three-parameter cubic equation of state derived from the Redlich-Kwong-Peng-Robinson equation developed by Martin Cismondi and Jorgen Mollerup (in "Development and application of a three-parameter RK-PR equation of state", *Fluid Phase Equilibria*, 232, 2005, pages 74-89). For the liquid and the vapour phase, the computed data 92, namely the mass densities $\rho_{l,f}$ and $\rho_{v,f}$, the internal mass energies $U_{l,f}$ and $U_{v,f}$, and the mass enthalpies $H_{l,f}$ and $H_{v,f}$, are determined on the basis of the input data 91 specified by the operator.

As the two-phase mixture changes between the initial state 8 and the final state 9, the liquid bleeding rate $\dot{m}_l$, the vapour bleeding rate $\dot{m}_v$, and the contributed power by virtue of heat ingress through the walls of a tank $\dot{Q}$ are assumed to be constant. The liquid and vapour bleeding rates can be measured by flow rate sensors or specified by the operator. The power $\dot{Q}$ is determined on the basis of the Boil-Off Rate (BOR) of the tank, usually provided by the manufacturer. This parameter characterizes the thermal resistance of the tank insulation to any heat ingress. In a preferred embodiment, the BOR is corrected by taking into account the filling level of the tank.

Solving the system of conservation of mass and energy equations between the initial state 8 and the final state 9 allows the value of the desired transition parameter to be computed directly.

According to one embodiment, at set vapour $\dot{m}_v$ and liquid $\dot{m}_l$ bleeding rates, the operator specifies a final pressure $P_f$ above the initial pressure $P_i$ in order to compute a pressure build-up time T inside a sealed and unrefrigerated tank 2, 4, 5, 6 or 7. For example, when an LNG tanker or an LNG-propelled vessel is moored in a port area where the regulations stipulate shutting down the main and auxiliary engines (with the vessel then being supplied with onshore electricity), and prohibit flaring or venting of the evaporated LNG, the operator needs to know the time during which the vessel will be able to remain at the quayside while maintaining a pressure level that is acceptable for the operability of the tank.

According to an alternative embodiment, at set vapour $\dot{m}_v$ and liquid $\dot{m}_l$ bleeding rates, the operator specifies a final pressure $P_f$ below the initial pressure $P_i$ in order to compute a pressure drop time $\tau$ inside a sealed and unrefrigerated tank 2, 4, 5, 6 or 7. For example, when the engines of an LNG tanker or LNG-propelled vessel consume more than the flow of naturally evaporated gas, the operator needs to know how much time is available before liquid bleeding needs to be carried out in order to supply the engines and maintain the pressure at a level that is acceptable for the operability of the tank.

According to another embodiment, at a set transition duration τ and liquid bleeding rate $\dot{m}_l$, the operator specifies the final pressure $P_f$ in order to compute the vapour bleeding rate $\dot{m}_v$ in a sealed and unrefrigerated tank 2, 4, 5, 6 or 7. For example, when the stopover time of an LNG tanker or LNG-propelled vessel is predetermined, the operator may need to know the vapour bleeding rate that should be applied in order to supply the auxiliary engines, which generate on-board electricity, while keeping the pressure at an acceptable value for the operability of the tank.

Figure 4:
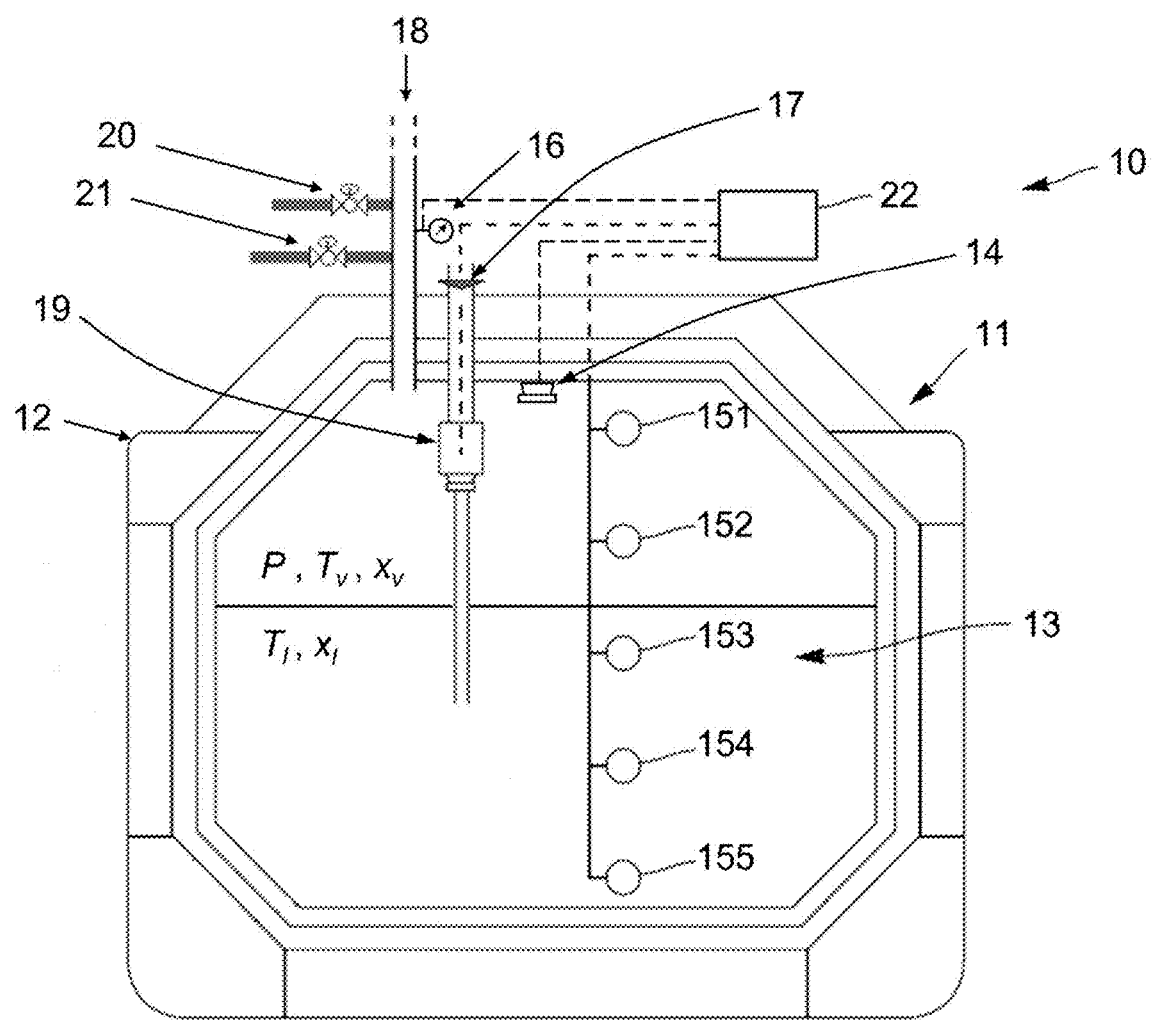
FIG. 4 is a schematic cross-sectional view of a liquefied gas storage system, in which the method of FIG. 3 can be implemented.

FIG. 4 is a schematic cross-sectional view of a system 10 for computing a transition parameter using the method described above, in a sealed and unrefrigerated tank 11, the walls of which are mounted in a supporting structure 12 with a polyhedral geometry. The sealed and unrefrigerated tank 11 contains a two-phase mixture of liquefied gas and vapour 13 at a very low temperature and comprises: a level sensor 14, temperature sensors 151 to 155, a pressure sensor 16, a composition sensor 17, vapour bleeding flow rate sensors 18, a pump located at the bottom of the tank allowing liquid bleeding and equipped with a flow rate sensor 19. The sealed and unrefrigerated tank 11 comprises a safety valve 20 and a vacuum breaker valve 21. The system 10 comprises a computation device 22 connected by a wired or wireless link with the sensors 14, 151 to 155, 16, 17, 18 and 19 mentioned above in order to allow measurements to be obtained of the physical quantities necessary for computing the transition parameter.

According to one embodiment, the level sensor 14 for determining the volume of liquefied gas in the tank can be an electrical capacitance sensor, a float, a radar or a laser. In a preferred embodiment, the temperature sensors 151 to 155 can also fulfil this function.

According to one embodiment, the temperature sensors 151-155 are temperature probes, in general there are four or five probes, distributed over the entire height of the tank at known altitudes. In a preferred embodiment, the probes are installed such that at least one probe 153, 154 or 155 is immersed in the liquefied gas, and at least one probe 151 or 152 is located at the level of the vapour phase. Measuring the level of the liquefied gas in the tank allows the submerged probes and the probes located in the vapour phase to be identified based on the known altitude of each probe. When several probes are immersed in the liquefied gas, the temperature measurements are averaged in order to determine the initial temperature of the liquid phase $T_{l,i}$. Similarly, when several probes are located in the vapour phase, the temperature measurements are averaged in order to determine the initial temperature of the vapour phase $T_{v,i}$.

According to one embodiment, the pressure sensor 16 is a manometer measuring the manometric pressure of the gaseous phase in the tank. The manometric pressure is then corrected by taking into account the atmospheric pressure in order to determine the initial pressure of the gaseous ceilng $P_i$.

According to one embodiment, the composition sensor 17 is a gaseous phase chromatograph analyzing samples of re-evaporated liquefied gas in order to determine the initial composition of the liquid phase $x_{l,i}$.

According to one embodiment, the flow rate sensors for measuring vapour bleeding 18 are flow meters installed at the inlet of the boilers and engines supplied with gas. The flow rate sensor for measuring the flow rate of liquefied gas bleeding 19 is a flow meter located at the pump outlet. In a preferred embodiment, the flow meters are Coriolis effect mass flow meters.

In one embodiment, the tank comprises a safety valve 20 that opens automatically at its setting pressure. In the case of a tank containing LNG, the setting pressure is generally set to 700 mbarg or to 2 barg. For example, when the main engines of an LNG tanker or LNG-propelled vessel are shutdown, the consumption of the auxiliary engines is insufficient to compensate for the flow of evaporated gas, and the regulatory conditions prohibit the excess gas from being flared or vented, the operator needs to know the pressure build-up time T of the gaseous ceiling to the pressure for automatically opening the valve. In this case, the operator specifies a final vapour phase pressure $P_f$ that is less than or equal to the setting pressure of the safety valve 20 but is greater than or equal to the initial vapour phase pressure $P_i$.

According to one embodiment, the tank comprises a vacuum breaker valve 21 that automatically opens at its setting pressure. In the case of a tank containing LNG, the setting pressure of the vacuum breaker valve is generally set to 20 mbarg or to 50 mbarg. For example, when the engines of an LNG tanker or an LNG-propelled vessel consume more than the flow rate of naturally evaporated gas, the operator needs to know the time of the pressure drop r from the gaseous ceiling to the pressure for automatically opening the vacuum breaker valve. In this case, the operator specifies a final vapour phase pressure $P_f$ that is greater than or equal to the setting pressure of the vacuum breaker valve 21 but is less than or equal to the initial vapour phase pressure $P_i$.

FIG. 5 schematically shows the interface that notifies the operator of the input data specific to the gas storage system (pressure, temperature, volume and composition) and the computed transition parameter. In this example, the liquefied gas is LNG cooled to a temperature of −161.15° C. The initial volume of liquefied gas contained in the tank $V_{l,i}$ is expressed as a percentage of a filling rate.

According to one embodiment, the operator specifies the final pressure $P_f$ and the input data specific to the two-phase mixture 13 are physical quantities measured by one or more level 14, temperature 151 to 155, pressure 16, composition 17 and flow rate 18 and 19 sensor(s). The measured physical quantities are conveyed to the operator via a human-machine interface interacting with the computation device 22.

As an alternative embodiment, the operator specifies the final pressure $P_f$ and all or some of the input data specific to the two-phase mixture 13, which are known (for example, the initial composition of the liquid phase $x_{l,i}$ at the time of loading the liquefied gas indicated in the quality certificate and the bill of lading) or have been precomputed (for example, the initial composition of the liquid phase $x_{l,i}$ determined from an ageing model of the liquefied gas).

Some of the elements that are shown, in particular the computation device 22, can be produced in various forms, in a unitary or distributed manner, by means of hardware and/or software components. Hardware components that can be used are specific ASICs, FPGAs or microprocessors. Software components can be written in various programming languages, for example, C, C++, Java or VHDL. This list is not exhaustive.

Although the invention has been described in relation to several particular embodiments, it is clear that it is by no means limited thereto and that it includes all the technical equivalents of the described means, as well as the combinations thereof if these fall within the scope of the invention.

The use of the verbs "comprise" or "include" and their conjugated forms does not exclude the presence of elements or steps other than those described in a claim.

In the claims, any reference sign between brackets must not be interpreted as being a limitation of the claim.

What is claimed is:

1. A computer-implemented method for computing a transition parameter of a liquefied gas storage medium, the storage medium comprising at least one sealed and unrefrigerated tank (2, 4, 5, 6, 7 or 11) equipped with a safety valve (20), the transition parameter characterizing an evolution of a two-phase mixture (13) contained in the sealed and unrefrigerated tank between an initial state (8) and a final state (9), the two-phase mixture including a liquid phase and a vapour phase, wherein said transition parameter is selected in a group consisting of a duration of the transition $\tau$, a liquid bleeding rate $\dot{m}_l$ or a vapour bleeding rate $\dot{m}_v$, the method comprising the steps of:

determining, for the liquid phase and the vapour phase in the initial state (8), initial mass densities $\rho_{l,i}$ and $\rho_{v,i}$, and initial internal mass energies $U_{l,i}$ and $U_{v,i}$ on the basis of an initial liquid phase temperature $T_{l,i}$, an initial vapour phase temperature $T_{v,i}$, an initial vapour phase pressure $P_i$, an initial liquid phase volume $V_{l,i}$ and an initial liquid phase composition $x_{l,i}$;

determining, for the liquid phase and the vapour phase in the final state (9), final mass densities $\rho_{l,f}$ and $\rho_{v,f}$, final internal mass energies $U_{l,f}$ and $U_{v,f}$, and final mass enthalpies $H_{l,f}$ and $H_{v,f}$ on the basis of an equation of state and a final vapour phase pressure $P_f$, the final pressure of the vapour phase $P_f$ being less than or equal to the setting pressure of the safety valve (20) and greater than or equal to the initial pressure of the vapour phase $P_i$;

computing the transition parameter using the following equation:

$$\tau(\dot{Q}+\dot{m}_v(H_{v,f}-\overline{U})+\dot{m}_l(H_{l,f}-\overline{U}))=\rho_{l,i}V_{l,i}(\overline{U}-U_{l,i})+\rho_{v,i}(V_t-V_{l,i})(\overline{U}-U_{v,i})+\rho_{v,f}V_t(U_{v,f}-\overline{U})$$

in which $\dot{Q}$ corresponds to an energy contribution by heat ingress through the walls of a tank per unit of time, $V_t$ corresponds to a total volume of the tank and with $$\overline{U} = \frac{\rho_{l,f}U_{l,f} - \rho_{v,f}U_{v,f}}{\rho_{l,f} - \rho_{v,f}}.$$

2. A computer-implemented method for computing a transition parameter of a liquefied gas storage medium, the storage medium comprising at least one sealed and unrefrigerated tank (2, 4, 5, 6, 7 or 11) equipped with a vacuum breaker valve (21), the transition parameter characterizing an evolution of a two-phase mixture (13) contained in the sealed and unrefrigerated tank between an initial state (8) and a final state (9), the two-phase mixture including a liquid phase and a vapour phase, wherein said transition parameter is selected in a group consisting of a duration of the transition $\tau$, a liquid bleeding rate $\dot{m}_l$ or a vapour bleeding rate $\dot{m}_v$, the method comprising the steps of:

determining, for the liquid phase and the vapour phase in the initial state (8), initial mass densities $\rho_{l,i}$ and $\rho_{v,i}$, and initial internal mass energies $U_{l,i}$ and $U_{v,i}$ on the basis of an initial liquid phase temperature $T_{l,i}$, an initial vapour phase temperature $T_{v,i}$, an initial vapour phase pressure $P_i$, an initial liquid phase volume $V_{l,i}$ and an initial liquid phase composition $x_{l,i}$;

determining, for the liquid phase and the vapour phase in the final state (9), final mass densities $\mu_{l,f}$ and $\rho_{v,f}$, final internal mass energies $U_{l,f}$ and $U_{v,f}$, and final mass enthalpies $H_{l,f}$ and $H_{v,f}$ on the basis of an equation of state and a final vapour phase pressure $P_f$, the final pressure of the vapour phase $P_f$ is greater than or equal to the setting pressure of the vacuum breaker valve (21) and less than or equal to the initial pressure of the vapour phase $P_i$;

computing the transition parameter using the following equation:

$$\tau(\dot{Q}+\dot{m}_v(H_{v,f}-\overline{U})+\dot{m}_l(H_{l,f}-\overline{U}))=\rho_{l,i}V_{l,i}(\overline{U}-U_{l,i})+\rho_{v,i}(V_t-V_{l,i})(\overline{U}-U_{v,i})+\rho_{v,f}V_t(U_{v,f}-\overline{U})$$

in which $\dot{Q}$ corresponds to an energy contribution by heat ingress through the walls of a tank per unit of time, $V_t$ corresponds to a total volume of the tank and with $$\overline{U} = \frac{\rho_{l,f}U_{l,f} - \rho_{v,f}U_{v,f}}{\rho_{l,f} - \rho_{v,f}}.$$

3. The method according to claim 1, wherein the storage medium comprises a plurality of tanks (2, 4, 5, 6, 7 and 11) and, for the liquid phase and the vapour phase, the initial and final mass densities, the initial and final internal mass energies and the final mass enthalpies are determined for each tank, and wherein the transition parameter is computed using the following equation:

$$\tau(\dot{Q}_j+\Sigma\dot{m}_{v,f,j}(H_{v,f,j}-\overline{U}_j)+\Sigma\dot{m}_{l,j}(H_{l,f,j}-\overline{U}_j))=\Sigma\rho_{l,i,j}V_{l,i,j}(\overline{U}_j-U_{l,i,j})+\Sigma\rho_{v,i,j}(V_{t,j}-V_{l,i,j})(\overline{U}_j-U_{v,i,j})+\Sigma\rho_{v,f,j}V_{t,j}(U_{v,f,j}-\overline{U}_j)$$

where the exponent j refers to the index of the considered tank.

4. The method according to claim 1, wherein the transition parameter is the transition duration $\tau$, and wherein the vapour bleeding rate $\dot{m}_v$ and the liquid bleeding rate $\dot{m}_l$ are predetermined.

5. The method according to claim 1, wherein the transition parameter is the vapour bleeding rate $\dot{m}_v$, and wherein the liquid bleeding rate $\dot{m}_l$, and the duration of the transition are predetermined.

6. The method according to claim 1, wherein the transition parameter is the liquid bleeding rate $\dot{m}_l$, and wherein the vapour bleeding rate $\dot{m}_v$ and the duration of the transition are predetermined.

7. The method according to claim 1, wherein the storage medium comprises at least one level sensor (14) configured to determine the volume of the liquid phase in at least one sealed and unrefrigerated tank (2, 4, 5, 6, 7 or 11), and the initial volume of the liquid phase $Vl_{l,i}$ is determined by the level sensor (14).

8. The method according to claim 1, wherein the storage medium comprises at least one temperature sensor (151 or 152) configured to measure the temperature of the vapour phase and at least one temperature sensor (153, 154 or 155) configured to measure the temperature of the liquid phase in at least one sealed and unrefrigerated tank (2, 4, 5, 6, 7 or 11), and the initial temperature of the vapour phase $T_{v,i}$ and the initial temperature of the liquid phase $T_{l,i}$ are measured by the temperature sensors (151 to 155).

9. The method according to claim 1, wherein the storage medium comprises at least one pressure sensor (16) configured to measure the pressure of the vapour phase in at least one sealed and unrefrigerated tank (2, 4, 5, 6, 7 or 11), and the initial pressure of the vapour phase $P_i$ is measured by the pressure sensor (16).

10. The method according to claim 1, wherein the storage medium comprises at least one composition sensor (17) configured to determine the composition of the liquid phase in at least one sealed and unrefrigerated tank (2, 4, 5, 6, 7 or 11), and wherein the initial composition of the liquid phase $x_{l,i}$ is determined by the composition sensor.

11. The method according to claim 1, wherein the storage medium comprises at least one flow rate sensor configured to measure a vapour bleeding mass flow rate (18) or a liquid bleeding mass flow rate (19) exiting a sealed and unrefrigerated tank (2, 4, 5, 6, 7 or 11), and wherein the liquid bleeding mass flow rate $\dot{m}_l$ or the vapour bleeding mass flow rate $\dot{m}_v$ is determined by the flow rate sensor (18 or 19).

12. The method according to claim 1, wherein the two-phase mixture (13) is a combustible mixture.

13. The method according to claim 12, wherein the combustible mixture is selected from a list consisting of liquefied natural gas, liquefied petroleum gas and liquefied hydrogen.

14. The method according to claim 12, wherein the sealed and unrefrigerated tank is a fuel reservoir for propelling a land, marine, air or space vehicle.

15. A system (10) for computing a transition parameter of a liquefied gas storage medium characterizing an evolution of a two-phase mixture (13) between an initial state (8) and a final state (9), wherein the transition parameter is selected in a group consisting of a duration of the transition τ, a liquid bleeding rate $\dot{m}_l$ or a vapour bleeding rate $\dot{m}_v$, the system comprising:
- a storage medium comprising at least one sealed and unrefrigerated tank (2, 4, 5, 6, 7 or 11) containing the two-phase mixture, said two-phase mixture including a liquid phase and a vapour phase;
- a computation device (22) configured to implement the method according to claim 1;
- a human-machine interface interacting with the computation device in order to notify an operator of the computed transition parameter.

16. Land, marine, air or space vehicle comprising a fuel reservoir for propelling the vehicle and a system according to claim 15 configured to compute a transition parameter of the fuel tank.

17. A non-transitory computer readable medium comprising program instructions that, when executed by an apparatus, cause the apparatus to perform the method according to claim 1.

* * * * *